United States Patent
Kitchin et al.

(10) Patent No.: US 6,597,631 B2
(45) Date of Patent: Jul. 22, 2003

(54) COMPACT EXPANDABLE PLATFORM USING MATERIAL MEMORY FOR SENSOR DEPLOYMENT

(75) Inventors: David A. Kitchin, Laurel, MD (US); Ronald W. Mitnick, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 10/178,377

(22) Filed: Jun. 24, 2002

(65) Prior Publication Data

US 2002/0196707 A1 Dec. 26, 2002

Related U.S. Application Data

(60) Provisional application No. 60/301,064, filed on Jun. 26, 2001, and provisional application No. 60/323,403, filed on Sep. 19, 2001.

(51) Int. Cl.⁷ ................................................. H04B 1/59
(52) U.S. Cl. ................................................. 367/4; 367/3
(58) Field of Search .............................. 367/3, 4, 153; 441/7, 11

(56) References Cited

U.S. PATENT DOCUMENTS

| | | | | |
|---|---|---|---|---|
| 3,803,540 A | * | 4/1974 | Mar et al. .................... | 367/4 |
| 3,986,159 A | * | 10/1976 | Horn .............................. | 367/4 |
| 4,298,964 A | * | 11/1981 | Warnshuis et al. ............. | 367/4 |
| 5,197,036 A | * | 3/1993 | Buckingham ................... | 367/4 |
| 6,400,645 B1 | * | 6/2002 | Travor ............................ | 367/3 |

* cited by examiner

*Primary Examiner*—Ian J. Lobo
(74) *Attorney, Agent, or Firm*—Benjamin Y. Roca, Esq.; Ernest R. Graf, Esq.

(57) ABSTRACT

An expandable platform for deploying sensors in a medium includes a housing and a structural member disposed inside the housing. A releasable restraint is connected to the structural member. Multiple arms are connected to the structural member. Each arm includes a material memory component that has a natural state, corresponding to a minimum energy state, in an extended configuration. The material memory component is energized by compacting the material memory component so that the arm fits within the housing. The material memory component is restrained in an energized state by the restraint, and naturally transforms toward the extended configurations under its own force when the restraint is released. A flexible cable external to the arms is connected to two or more arms, each at a tip portion of the arm. The tip portion is farthest from the structural member when the material memory component is in the extended configuration. Multiple sensors are connected to the cable.

43 Claims, 10 Drawing Sheets

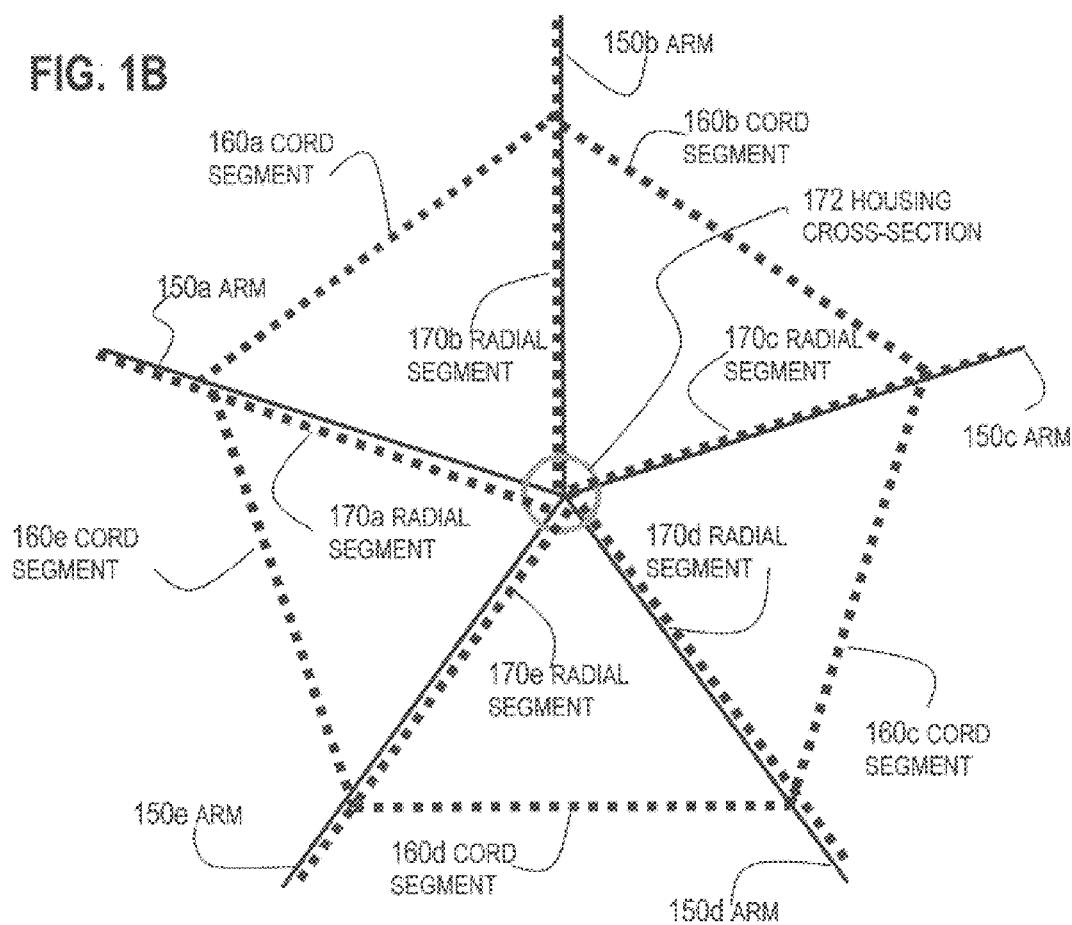

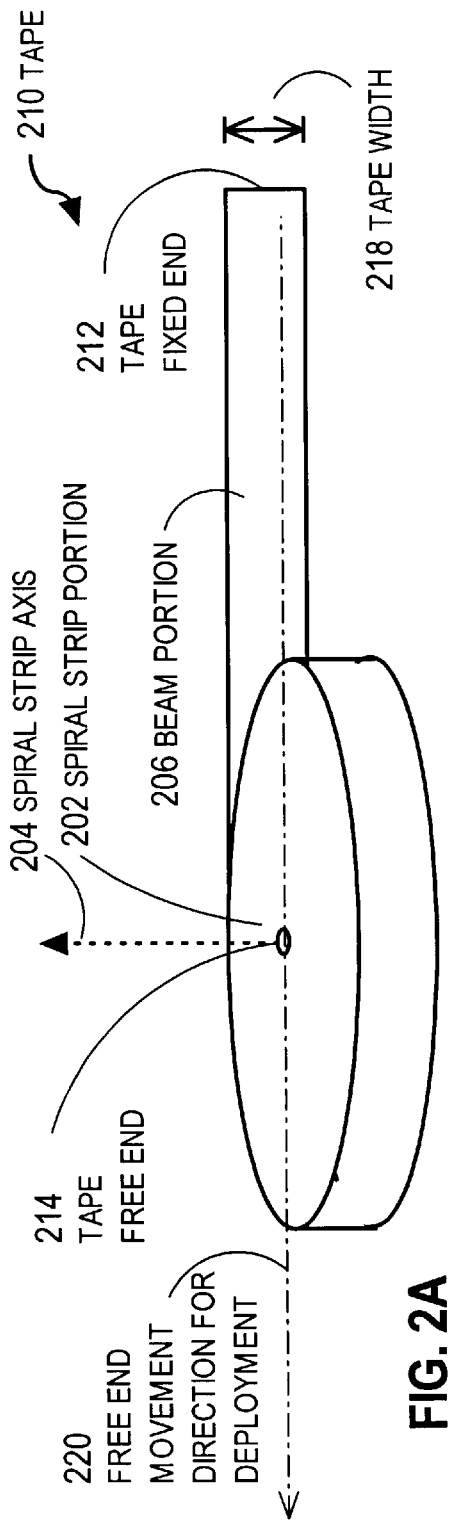
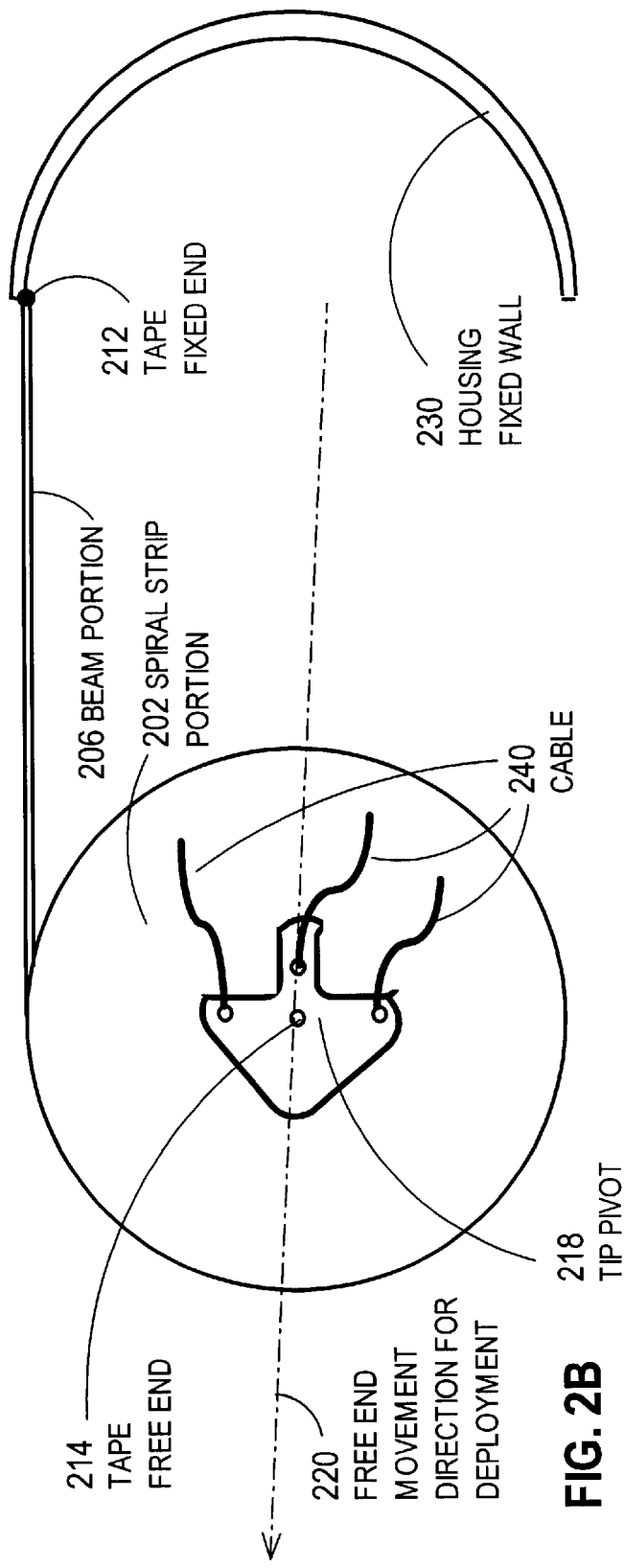
FIG. 2A
FIG. 2B

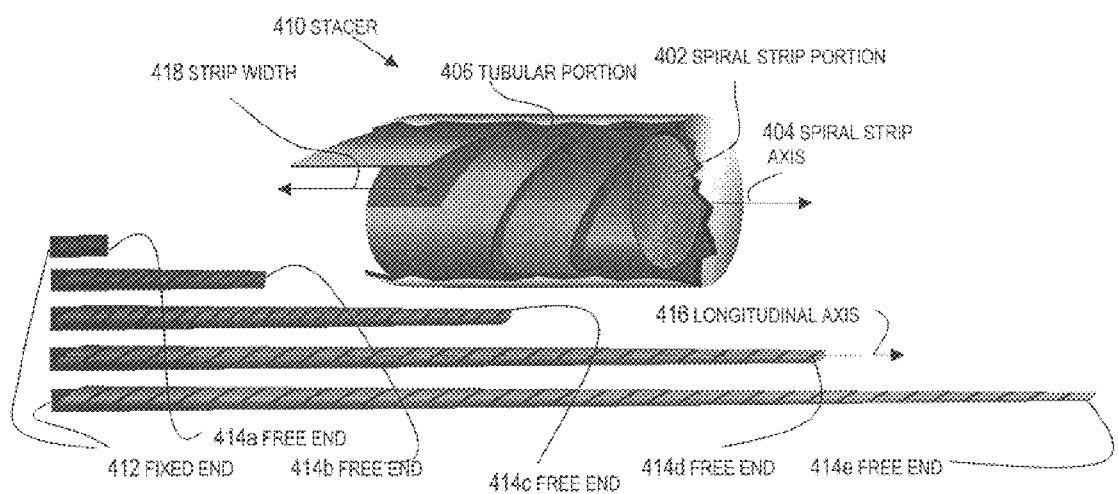

COMPACT EXPANDABLE PLATFORM USING MATERIAL MEMORY FOR SENSOR DEPLOYMENT

CROSS-REFERENCE TO RELATED APPLICATIONS

This application claims benefit of Provisional Applications 60/301,064, filed Jun. 26, 2001, titled "Use of Metallic Tape with Memory for Sonobuoy Hydrophone Array Deployment," and 60/323,403, filed Sep. 19, 2001, titled "Advanced Sonobuoy," the entire contents of which are hereby incorporated by reference as if fully set forth wherein, under 35 U.S.C. §119(e).

STATEMENT OF GOVERNMENTAL INTEREST

This invention was made with Government support under Contract No. N00024-98-D-8124 awarded by the Department of the Navy. The Government has certain rights in the invention.

BACKGROUND OF THE INVENTION

1. Field of the Invention

The present invention relates to expandable platforms for deploying sensors in a medium; and, in particular, to expandable platforms that use material memory to expand arms that support cables with connected sensors.

2. Description of the Related Art

There are a large number of circumstances in which it is desirable to deploy a group of sensors in a medium according to some predetermined pattern. The predetermined pattern may enclose a one-dimensional linear segment, a two-dimensional area or a three-dimensional volume. Often the sensors are deployed for a limited period of time in remote locations. To efficiently transport the groups of sensors to the remote locations, the groups of sensors are compacted into relatively small packages for transport. At one of the remote locations, a package is launched; and the sensors unfold into the predetermined pattern for deployment. In many cases, the sensors are attached to an expandable platform that is compacted to fit in the transport package, and that expands after launch to an extended, deployed state.

One class of such circumstances involve deploying hydrophones for a limited period of time in natural bodies of water to detect direction or range or both to one or more sources of sound. Recently, volumetric hydrophone arrays have been developed that utilize a web of cables with integrated sensors attached to an expanding platform for delivery by aircraft. The volumetric array packages are designed to fit within conventional airborne package launching systems. A common launching system for large aircraft handles cylindrical packages with a diameter of about five (5) inches (0.12 meters, m) and with a length of about 36 inches (0.9 m). A package that fits in this common launcher is called herein a "standard-sized package." After allowing space for other components, such as a parachute, surface float, electronics and batteries, the longest allowed platform length within the standard sized package is about 15 inches (0.38 m).

An expanding platform used in packages for the large aircraft is based on multiple telescoping arms that are collapsed for launch and that extend after launch. After launch, the telescoping sections of each arm are extruded from the package as the package falls through the water under its own weight and momentum, with tension provided by a float that rises to the surface of the water. The telescoping arms are connected at their bases by hinges. After the telescoping sections of each arm has been extruded, the base stops falling, held at depth by a tether to the float. The tips of the arms fall under the influence of gravity and the hinges at their bases, until the arms are fully deployed like spokes on a wheel. In certain designs, either the hinges or cables attached to the tips prevent the arms from forming a flat wheel; and, instead, the hinges or cables cause the arms to lie on the surface of a cone, a surface that usually makes a small angle relative to the horizontal. Some such designs arrange the arms so that the cables with the sensors lie in an essentially horizontal plane.

A web of cables connected to the arms often include radial segments that connect the tip of an arm to a point near or vertically displaced a small distance from the base of the arm, and cord segments that connect points near the tips of two different arms. Hydrophones prearranged along the cables form a volumetric array when the platform is deployed.

While suitable for many purposes, the conventional expanding platform suffers several deficiencies for deployment in natural bodies of water. The telescoping joints are points of failure, the maximum length of extension is inadequate for some purposes, and the collapsed telescopes cannot fit in launch systems for small, autonomous aircraft.

In the extended state, each joint where two telescoping sections meet becomes a point of weakness, susceptible to failure when stresses are applied to the arms. Stresses come from vertical motions ("heave") induced by surface wave motions transferred through the surface float, and from horizontal motion variations ("shear") induced by differential currents. Consequently, to survive sea states up to sea state 5 and shears of up to two nautical miles per hour ("knots") for several days, and still fit in the standard-sized package, arms made of telescoping sections are limited to five sections that extend in sum to no more than about 10 feet (about 3 m).

A maximum ten-foot extension limits the total diameter of the deployed sensor system to a distance, called an "aperture," of 20 feet (about 6 m). This aperture is too small for some phenomena of interest. For example, a small amplitude wave in ocean pressure, thermal, salinity, optical or acoustic signals longer than 40 feet (about 12 m) is not readily detected with such a small aperture.

In some applications it is desirable to fit multiple platforms in the standard-sized package. For example, it is desirable to stack two compacted platforms with 20-foot aperture, or to stack more compacted platforms with smaller aperture. Such stacking leaves only about 3 to 7 inches of package length per compacted platform. The telescoping arms cannot fit into such short packages and still provide the apertures desired for some oceanic signals.

A common launching system for small or autonomous aircraft handles cylindrical packages with a diameter of about two inches (0.05 m) and with a length of about 12 inches (about 0.300 m). This is about a quarter the volume of the large aircraft launching systems. The telescoping arms cannot fit in such a small package and still provide the aperture desired for some oceanic signals. Thus the telescoping platform is often not appropriate for autonomous aircraft launch.

For the reasons described above, there is a clear need for an expandable platform that does not suffer the deficiencies of existing expandable platforms.

The past approaches described in this section could be pursued, but are not necessarily approaches that have been previously conceived or pursued. Therefore, unless otherwise indicated herein, the approaches described in this section are not admitted to be prior art merely by inclusion in this section.

SUMMARY OF THE INVENTION

According to one aspect of the invention, an expandable platform for deploying sensors in a medium includes a housing and a structural member disposed inside the housing. A releasable restraint is connected to the structural member. Multiple arms are connected to the structural member. Each arm includes a material memory component that has a natural state, corresponding to a minimum energy state, in an extended configuration. The material memory component is energized by compacting the material memory component so that the arm fits within the housing. The material memory component is restrained in an energized state by the restraint, and naturally transforms toward the extended configurations under its own force when the restraint is released. A flexible cable external to the arms is connected to two or more arms, each at a tip portion of the arm. The tip portion is farthest from the structural member when the material memory component is in the extended configuration. Multiple sensors are connected to the cable.

According to another aspect of the invention, a method of fabricating an expandable platform for deploying sensors in a medium includes connecting the sensors to a web of cable segments. Multiple arms are compacted and restrained inside a housing. Each arm includes material having material memory for an extended configuration. The extended configuration has at least one dimension that exceeds any dimension of the housing. The web of cable segments are packed in a package inside the housing and outside the arms. At least one cable segment is attached to a tip portion of each arm. The tip portion is disposed farthest from the housing when the material is in the extended configuration. The platform is prepared for deployment in the medium. This step includes providing for extracting the cable from the package, and freeing each arm of the plurality of arms, after the housing is launched into the medium by a user. Freeing each arm allows the arm to automatically expand outside the housing to the expanded configuration under a motive force supplied by the material memory.

According to another aspect of the invention, an expandable platform for deploying sensors in a medium includes a means for connecting the sensors to a web of cable segments. A means for compacting and restraining multiple arms inside a housing is also included. Each arm includes material having material memory for an extended configuration. At least one dimension of the extended configuration exceeds any dimension of the housing. A means is also included for packing the web of cable segments in a package inside the housing and outside the arms. A means is included for attaching at least one cable segment to a tip portion of each arm. The tip portion is disposed farthest from the housing when the material is in the extended configuration. A means is included for extracting the cable from the package after the housing is launched into the medium by a user. A means is also included for freeing each arm of the plurality of arms after the housing is launched into the medium by a user. The freed arms are allowed to automatically expand outside the housing toward the expanded configuration under a motive force supplied by the material memory.

These aspects allow a user to distribute sensors externally within a medium according to complex, non-linear patterns.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1B is a plan view diagram of an expanded platform for deploying sensors;

FIG. 2A is an elevated side view diagram of a partially compacted tape with material memory used in an arm of an expandable platform, according to an embodiment;

FIG. 2B is a plan view diagram of the partially compacted tape with material memory used in an arm of an expandable platform, according to an embodiment;

FIG. 4A is a perspective diagram of a partially compacted stacer with material memory, according to an embodiment;

FIG. 4B is a sequence of perspective diagrams of an expanding stacer with material memory, according to an embodiment;

DETAILED DESCRIPTION

A method and apparatus for deploying sensors in a medium is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

1. Operational Context

Embodiments of the invention are described in the context of volumetric patterns of sensors in terrestrial bodies of water, in which the medium is salt water or fresh water. However, the invention is not limited to this context. In other embodiments, the expanding platform may be adapted to operate in other media, such as other fluids, in gasses, such as air, and in space, such as planetary orbit or interplanetary or interstellar space.

2. Compact Package for Shipping

Figure 1A:
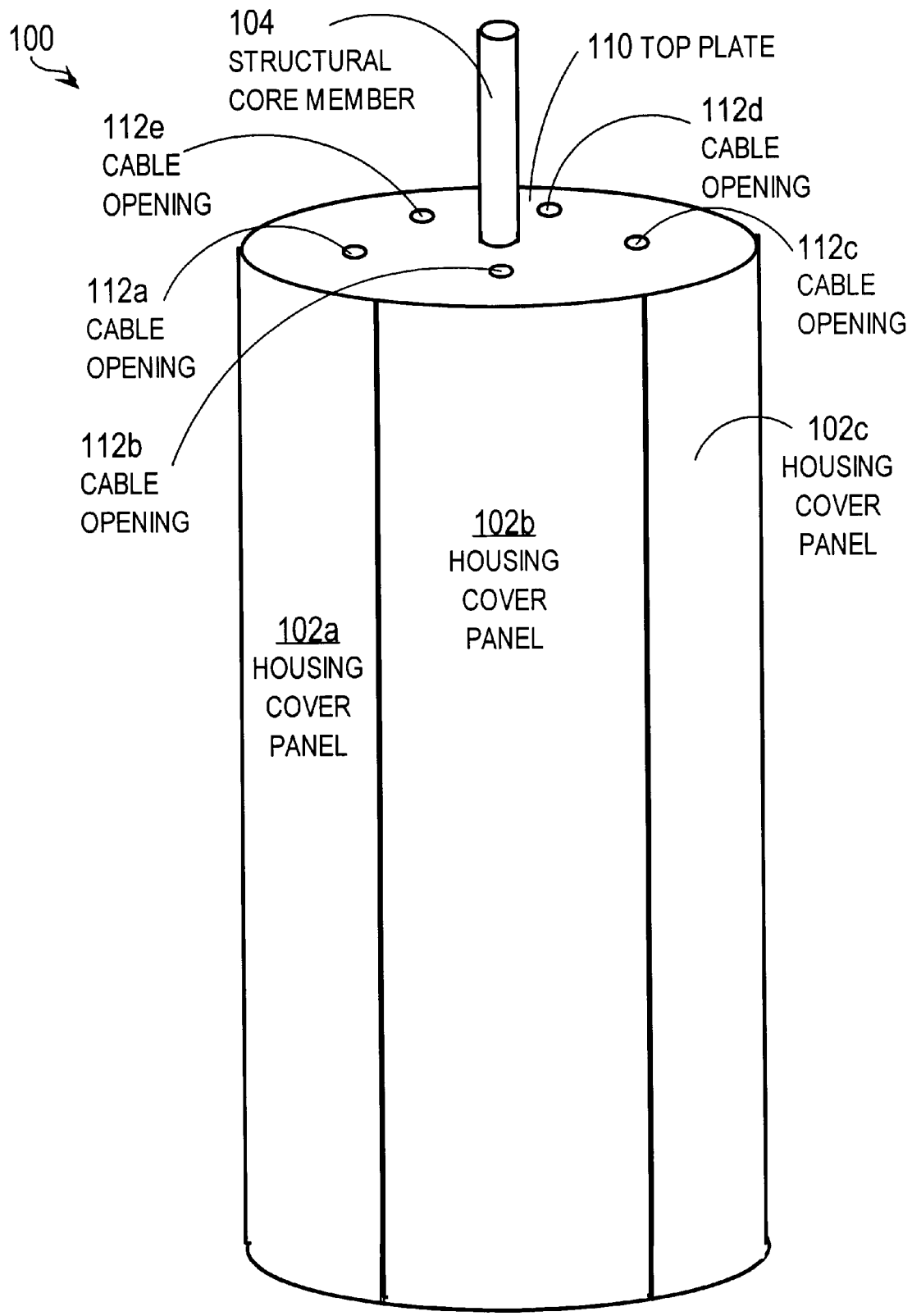
FIG. 1A is an elevated side view diagram of a package containing a compacted platform for deploying sensors, according to an embodiment.

FIG. 1A is an elevated side view diagram of a platform package 100 containing a compacted platform for deploying sensors, according to an embodiment. The package is shaped to fit in conventional launching tubes, such as a sonobuoy launching tube on large aircraft, as part of a standard-sized package. Thus the package 100 includes a cylindrical housing with diameter of about five inches (about 0.12 m) and length of about 15 inches (about 0.4 m). A core structural member 104 is attached to a tether and surface float (not shown). According to an illustrated embodiment, the core structural member 104 is attached to a top plate 110 with cable openings 112a, 112b, 112c, 112d, 112e, collectively referenced herein as cable openings 112. The cable openings 112 provide a point of attachment for a web of cable segments (not shown) to which sensors (not shown) are connected. The cable openings 112 also provide passage for signals originating in the sensors and carried by the cable to pass up through the tether to a recording or transmitting device in the surface float. In the illustrated embodiment, there are five cable openings, one for each of five arms in an extendable platform. In other embodiments, more or fewer cable openings are provided for each arm in the extendable platform and more or fewer than five arms are included in the extendable platform.

The cylindrical housing for package 100 includes cover panels 102a, 102b, 102c, collectively referenced herein as cover panels 102. The cover panels protect and restrain the components of an expandable platform during shipment and launch. After launch, the cover panels are released to allow the platform to expand and deploy the cable web with sensors. In some embodiments, the cover panels release by separating from the top plate, remain connected to the structural core member after release by hinges attached to a bottom plate (not shown), and serve as a substantively horizontal surface to damp vertical motions such as heave. In the illustrated embodiment, there are five cover panels 102, one for each of five arms in the extendable platform. In other embodiments, more or fewer cover panels are provided for each arm in the extendable platform.

3. Expanded Platform Arms with Material Memory

FIG. 1B is a plan view diagram of an expanded platform for deploying sensors. The expanded platform includes five arms 150a, 150b, 150c, 150d, 150e, collectively referenced herein as arms 150. A cross section 172 of the cylindrical housing is shown to illustrate the expansion of the platform; however, neither FIG. 1B, nor the other figures are drawn to scale. A web of flexible cables with connected sensors is attached to the five arms. The web includes five radial segments 170a, 170b, 170c, 170d, 170e, collectively referenced herein as radial segments 170. Each radial segment 170 is attached to a tip portion of an arm 150 and the top plate 110. The cable web also includes five cord segments 160a, 160b, 160c, 160d, 160e, collectively referenced herein as cord segments 160. Each cord segment 160 is attached to two adjacent arms 150 at points closer to the tip of each arm than to the structural core member 104.

In conventional platforms, each of the five arms is made up of five telescoping sections that are prone to failure at the joints between the sections. Each of the five arms is compacted by moving narrower sections within a widest, outermost telescoping section. For shipment and launch, the arms are compacted and the compacted telescoping sections are rotated to align in parallel with a longitudinal axis of the cylindrical package 100 depicted in FIG. 1A. After the package 100 is launched, the top plate 110 is decelerated by the tether and the surface float. The base of the package continues to fall using gravity and momentum to extend the five telescoping sections on each arm. After the arms are extended, the arms, hinged to the base, rotate outward under a combination of one or more forces, including their own weight and a linear-compression spring acting through a gear-segment mechanism. The arms rotate outward until they stop in positions depicted in FIG. 1B, which radiate outward, substantially perpendicular to the original axis of the cylindrical package. The rotation of the falling arms about the hinges to the base is stopped by structures that limit the rotation of the hinge. The arms can be stopped by the cable web at an angle smaller than 90 degrees, as measured in the plane of each arm and the original axis of the cylindrical package.

According to illustrated embodiments of the invention, the telescoping sections of the conventional platform are replaced by arms that expand based on material memory. Material memory refers to the property of some materials to return to an original state after a force is released that deforms and restrains the material. Such materials are well known in the art. A common example of material with material memory is a metal tape measure. The tape is formed of certain metals as a long thin beam with an arcuate cross section. This is its natural configuration. Under applied forces, the tape may be rolled into a spiral strip. The strip has a flat rather than arcuate cross section. The spiral strip is a deformed configuration. The strip may be restrained from unrolling. When the restraint is removed, the spiral strip unravels and resumes the beam configuration. The tape is said to have material memory for the beam configuration.

Because energy is consumed to change to the deformed configuration and energy is released as movement of the tape when the restraint is released and the tape resumes its natural configuration, the deformed configuration can be said to store potential energy. That is, the deformed configuration is in an energized state and the original state is the natural, minimum energy state. In some circumstances, the unrolling release of energy is initiated with some action by a user, such as pulling an outside end of the tape away from the spiral strip.

The deformed state may be either more or less compact than the natural state. Compactness is related to the ratio of the volume of a material to its surface area. The volume of the tape is the same before and after rolling. In the rolled configuration, the energized state, the surface area of the tape is proportional to the width of the tape and the diameter of the spiral. In the beam configuration, the natural state, the surface area is proportional to the width and the length of the tape. Because the beam is much longer than the diameter of the spiral, the energized state is much more compact than the natural state. A material may have material memory for a more compact state. For example, a material can be originally formed in the compact spiral configuration, like a spring, and deformed to the beam configuration.

According to the illustrated embodiments, materials are used that have deformed configurations that are more compact than their natural configuration. An extended arm with material in its natural configuration has uniform properties along the length of the expanded material and therefore is not subject to certain points of failures, such as the joints of the telescoping sections.

Two specific embodiments are described below, one embodiment using tape with material memory for a beam configuration, and another embodiment using stacers with material memory for a tube configuration. In other embodiments, other materials with material memory may be employed.

4. Tapes with Material Memory

FIG. 2A is an elevated side view diagram of a partially compacted tape 210 with material memory for a beam configuration used in an arm of an expandable platform, according to an embodiment. In the illustrated embodiment, the tape is made of spring steel. The tape has a tape width 218 that is much smaller than the tape length. The uncompacted portion of the tape 210 forms a beam portion 206 with an arcuate cross section, similar to an open parenthesis, "(." The compacted portion of the tape 210 forms a spiral strip portion 202. The spiral strip portion defines a spiral strip axis 204 of symmetry.

When used as part of an expanding arm, a fixed end 212 of the tape 210 is one end of the tape, which is fixed with respect to the structural core member 104. A free end 214 of the tape 210 is the other end. In the illustrated embodiment, the free end 214 is the end inside the spiral strip portion 202, in the vicinity of the spiral strip axis 204. The fixed end 212 is the end that is on the outer surface of the spiral strip portion during shipment and launch.

The partially compacted configuration depicted in FIG. 2A, is achieved during compaction, when the tape is rolled from the natural beam configuration into the energized spiral strip configuration. The partially compacted configuration depicted in FIG. 2A, is again achieved during expansion, when the tape unrolls under its own power from the energized spiral strip configuration into the natural beam configuration. FIG. 2A depicts the direction 220 of movement of the free end 214 (and movement of the spiral strip axis 204) during expansion for deploying the sensors. During compaction, the free end 214 and spiral strip axis 204 would move in the opposite direction to direction 220. As the free end 214 translates in direction 220, the free end also rotates about the spiral strip axis 204.

FIG. 2B is a plan view diagram of the partially compacted tape 210 with material memory used in an arm of an expandable platform, according to an embodiment. The spiral strip portion 202, the beam portion 206, the fixed end 212, the free end 214 and the direction 220 are the same as in FIG. 2A. FIG. 2B also depicts a housing fixed wall 230 and tip pivot piece 218 (hereinafter a "tip pivot").

The fixed end 212 is fixed with respect to the structural core member 104 through the housing fixed wall 230. The housing fixed wall is fixed with respect to the structural core member 104. The housing fixed wall has a cross section in the same plane as the tape 210. The cross section forms a circular arc with an interior diameter that substantially matches the diameter of the spiral strip when the tape 210 is fully rolled. The arc that completes the circle is provided by one or more housing cover panels 102. When the housing cover panels are in place and restrained, the tape is confined to the energized state in the spiral strip configuration. When the housing cover panels 102 are removed or unrestrained, the tape 210 is free to unroll toward its natural state.

In the absence of other forces acting on the arm, the tape will unroll completely to its natural configuration as a beam. When deployed in most media, such as air or water, however, there is resistance that might oppose the unrolling to some degree. In addition, gravity or some other external force, such as magnetism, might act to oppose the movement along direction 220, might assist the movement along direction 220, or might work perpendicular to the direction 220 to add material stresses that prevent full return to the natural state. Additionally, resistance might be introduced by pulling on cables attached to the free end of the tape 210. Furthermore, in some embodiments, resistance is introduced by the housing cover panels, which are moved to an open position by forces applied by one or more rolled tapes after a restraint that constrains the cover panels is released. As a result of such resistance, the tape might stop unrolling before returning completely to the natural state.

In the illustrated embodiments, cable with connected sensors is attached outside the material memory component. That is, the cable and sensors are not rolled up within the spiral strip. The cables may be disposed around the spiral strip or through the center at the spiral strip axis. The rotation of the free end may cause attached cables to become wound around each other, or otherwise to become tangled. Such winding and tangling is likely to prevent the tape from expanding to a desired extent, or to change the configuration of the cables and the connected sensors from the desired pattern. To avoid winding and tangling of attached cables and sensors, a tip pivot 218 is connected to the free end 214 of the tape 210. The tip pivot 218 is attached to the tape end 214 to allow the tape end 214 to rotate around the spiral strip axis 204 with respect to the tip pivot 218. Tip pivot 220 is designed to respond to flow pressures induced by movement through the medium and drag by the cables to align with the direction 220 of movement, as shown in FIG. 2B.

Figure 3A:
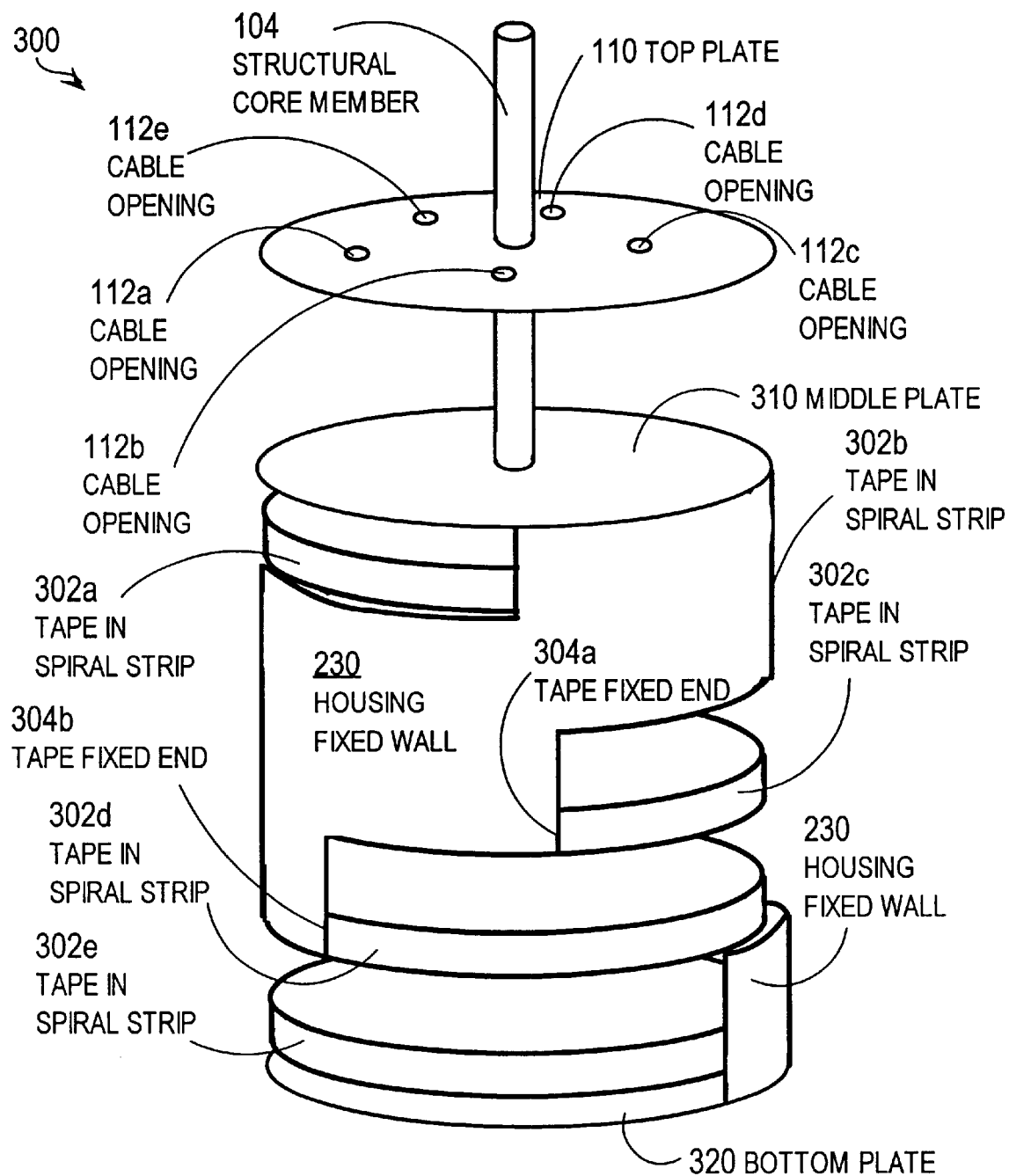
FIG. 3A is an elevated side view diagram of a package with restraints released for an expandable platform that uses compacted tape with material memory, according to an embodiment.

FIG. 3A is an elevated side view diagram of a package 300 with restraints released for an expandable platform that uses compacted tape with material memory, according to an embodiment. The housing cover panels 102 are not shown. Attached to the structural core member 104 is a middle plate 310 in addition to the top plate 110 shown in FIG. 1A. A fixed wall 230 for the housing, shown in cross section in FIG. 2B, is attached to the middle plate 310. A bottom plate 320 is attached at the bottom of the fixed wall 230.

In the illustrated embodiment, for each arm of the platform, one tape with material memory for a beam is included. In other embodiments, two or more tapes are included for each arm. Before release, each tape resides in the package 300 as an energized spiral strip. As illustrated, package 300 includes five tapes 302a, 302b, 302c, 302d, 302e, each in the spiral strip configuration (where a view of tape 302b is obscured by the fixed wall 230 in FIG. 3A).

A fixed end of each tape is attached to the fixed wall 230 of the housing. For example, fixed end 304a of tape 302c and fixed end 304b of tape 302d are shown attached to fixed wall 230. In the plane of each spiral strip, the fixed wall 230 is open along a sufficiently wide arc that the tape can unroll toward its natural, extended position, as shown in FIG. 2B. The open arc in the plane of each tape is rotated relative to the open arc in the planes of other tapes, so that each tape unrolls in a different direction. For five evenly-spaced arms, the open arcs are separated by multiples of 72 degrees. In the illustrated embodiment, the fixed wall displaces a semicircular opening by 72 degrees for each successive tape from a first tape 302a adjacent to the middle plate 310, to a fifth tape 302e adjacent to the bottom plate 320.

Positioned above or below each spiral strip, but not shown, is a tip pivot 218 attached to a free end of the corresponding tape.

Between the top plate 110 and the middle plate 310, the cable web and connected sensors (not shown) are packaged during shipment and launch. A radial segment of the cable web is connected to a trailing opening on each tip pivot 218 at one end and to a corresponding cable opening 113 on the top plate 110. One end of each cord segment of the cable web is connected to a side opening on one tip pivot 218, and the other end is connected to an opposite side opening on a second tip pivot 218 on a spiral strip for an adjacent arm. The slack cable web is collected in one or more cable packages in the space between plates 110 and 310. In other embodiments, other arrangements of cord and radial segments can be employed to develop other patterns of sensors in the medium.

Figure 3B:
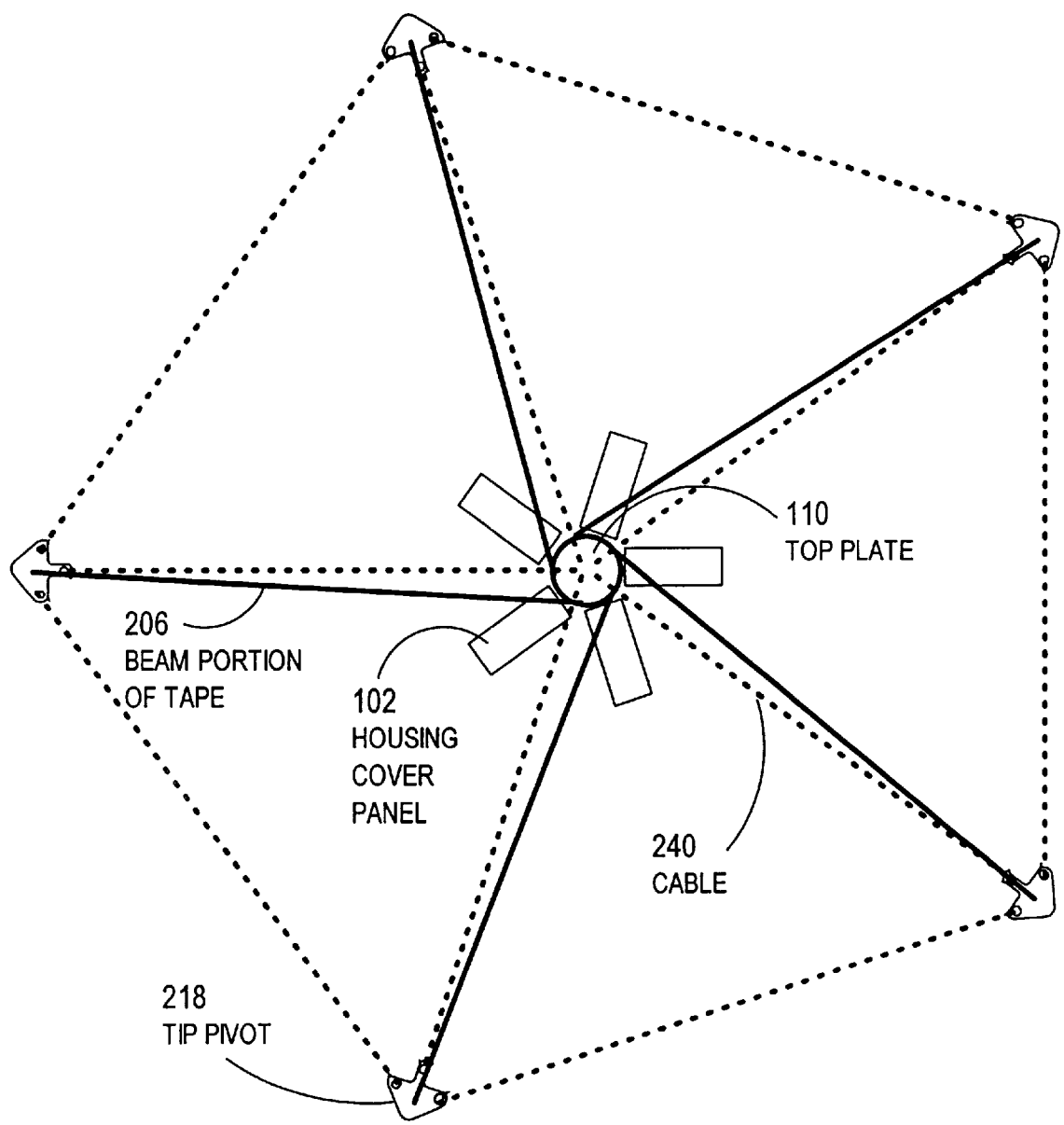
FIG. 3B is a plan view diagram of an expanded platform using tape with material memory for deploying sensors, according to an embodiment.

FIG. 3B is a plan view diagram of an expanded platform using tape with material memory for deploying sensors, according to the embodiment of FIG. 3A. After the housing cover panels are released, the tapes and corresponding tip pivots 218 move outward simultaneously with enough potential energy to overcome resistance of the housing cover panel and the drag of the water medium. In the illustrated embodiment, five housing cover panels 102 lie approximately in a horizontal plane, serving as a horizontal surface to dampen heave motions due to surface waves. The tapes also have enough energy to extract the cables and connected sensors from the cable packaging and to drag the cables through the water.

The tapes form a platform with fully extended beams 206 for all five arms. In the illustrated embodiment, the tape width lies in a substantially vertical plane, parallel to heave motions but subject to strong forces from shear. In some other embodiments, the tape width lies in a substantially horizontal plane, parallel to shear currents but subject to strong forces from heave. In some embodiments, the tape width lies in different planes for different arms. Each tape beam 206 in the illustrated embodiment exits the housing beneath the top plate 110 at a different vertical distance from the top plate. Attached to the tip portion of each beam is a tip pivot 218. Each radial segment of the cable segments 240 connects a middle opening on a tip pivot 218 to a corresponding opening on the top plate 110. Each cord segment of the cable segments 240 connects an outer opening on a tip pivot 218 to an outer opening on the tip pivot 218 of an adjacent arm.

The cable web made of cable segments 240 are pulled taut in the illustrated embodiment for 360 degrees around the structural core member. The taut cables add rigidity to the expanded platform by preventing excessive deflection of the tips of the tape beams 206. For example, finite element analysis suggests that telescoping tubes in one knot of shear current without cord segments would deflect about 14.5 inches (about 0.368 m); while the deflection reduces to 3.8 inches (about 0.096 m) with cord segments, a reduction factor of 3.8. Finite element analysis also suggests that spring steel tape deployed so the tape width is horizontal would be suitable in shear currents up to about one knot for arm lengths up to about four feet (about 1.2 m).

Finite element analysis suggestions that rigidity is also increased in a gravitational field by having the arms lie on the surface of a cone with a small angle above horizontal, rather than having the arm all lie in the same substantially horizontal plane. Rigidity is also increased by using Y-shaped sections of web cable between adjacent arms, as described in more detail below.

In many embodiments, the cable is made of a load-bearing component for providing structural rigidity to the arms when taut, and a separate signal wire that is connected to the load-bearing component with some slack. Signals communicated to and from the sensors pass through the signal wire. The signal wires are kept slack to keep the signal wires from separating due to shifting tensions on the cable; thus slack signal wires prevent interruptions to the signals flowing to or from the sensors.

According to some embodiments, a package that fits in small or autonomous aircraft launch tubes, such as helicopter chaff launchers, includes material memory tapes with spiral diameters less than about two inches (0.05 m). Tapes for multiple arms can be stacked in the package, which can be up to one foot (0.3 m) in length. When restraints are released, the tapes expand into multiple arms, each over one meter in length, that can withstand shear currents up to about one knot for at least several days.

According to some embodiments, a package that fits in standard aircraft launch tubes, includes material memory tapes with spiral diameters about five inches (0.1 m). Tapes for multiple arms can be stacked in the package, which can be up to about 15 inches (0.4 m) in length. When restraints are released, the tapes expand into multiple arms, each over one meter in length, that can withstand shear currents up to about one knot for several days. In some embodiments the tapes expand to greater lengths, about 8 feet (about 2.4 m), at which length the tapes can withstand only smaller shear currents for at least several days.

4. Stacers with Material Memory

FIG. 4A is a perspective diagram of a partially compacted stacer 410 with material memory for a tube configuration, according to an embodiment. The stacer 410 is a helical overlapping strip that has a strip width 418 that is much smaller than the strip length or tube length. The uncompacted portion of the stacer 410 forms a tubular portion 406. The compacted portion of the stacer 410 forms a spiral strip portion 404. The spiral strip portion defines a spiral strip axis 404 of symmetry.

In the illustrated embodiment, the stacer is made of stainless steel. Other materials that can be formed into stacers include beryllium copper and ELGILOY™ (a non-corroding watch spring material with an unlimited life span). A strip width of 6 inches (about 0.150 m) is used in the illustrated embodiment. A stacer made of stainless steel can extend unaided up to forty (40) times its width. The illustrated stacer with 6-inch strip width can therefore extend unaided to about 20 feet (over 6 m). In the extended, tubular configuration, the strip is displaced half a strip width with every circuit around a longitudinal axis of the tube. Such stacers are commercially available, for example, from Kaleva Designs and Ametek.

When used as part of an expanding arm, a fixed end of the stacer 410 is one end of the stacer, which is fixed with respect to the structural core member 104. A free end of the stacer 410 is the other end. In the illustrated embodiment, the fixed end is the outermost spiral strip on the tubular portion 406. The free end is the end that is on the innermost strip of the spiral strip portion 402 during shipment and launch.

FIG. 4B is a sequence of perspective diagrams of a stacer 410 with material memory at different times, according to an embodiment. During compaction under applied forces, time increases from bottom diagram to top diagram and potential energy is stored in the stacer. During expansion under its own motive force, time increases from top diagram to bottom diagram, and energy is converted to movement and work. The fixed end 412 is shown for each time in the sequence. At different times, the free end is depicted by 414*a*, 414*b*, 414*c*, 414*d*, 414*e*, collectively referenced as free end 414, at different distances from the fixed end 412. A longitudinal axis 416 for the tube is depicted in the perspective diagram of the stacer at the fourth time from the top. The longitudinal axis 416 is substantially coincident with the spiral strip axis 404.

Figure 4C:
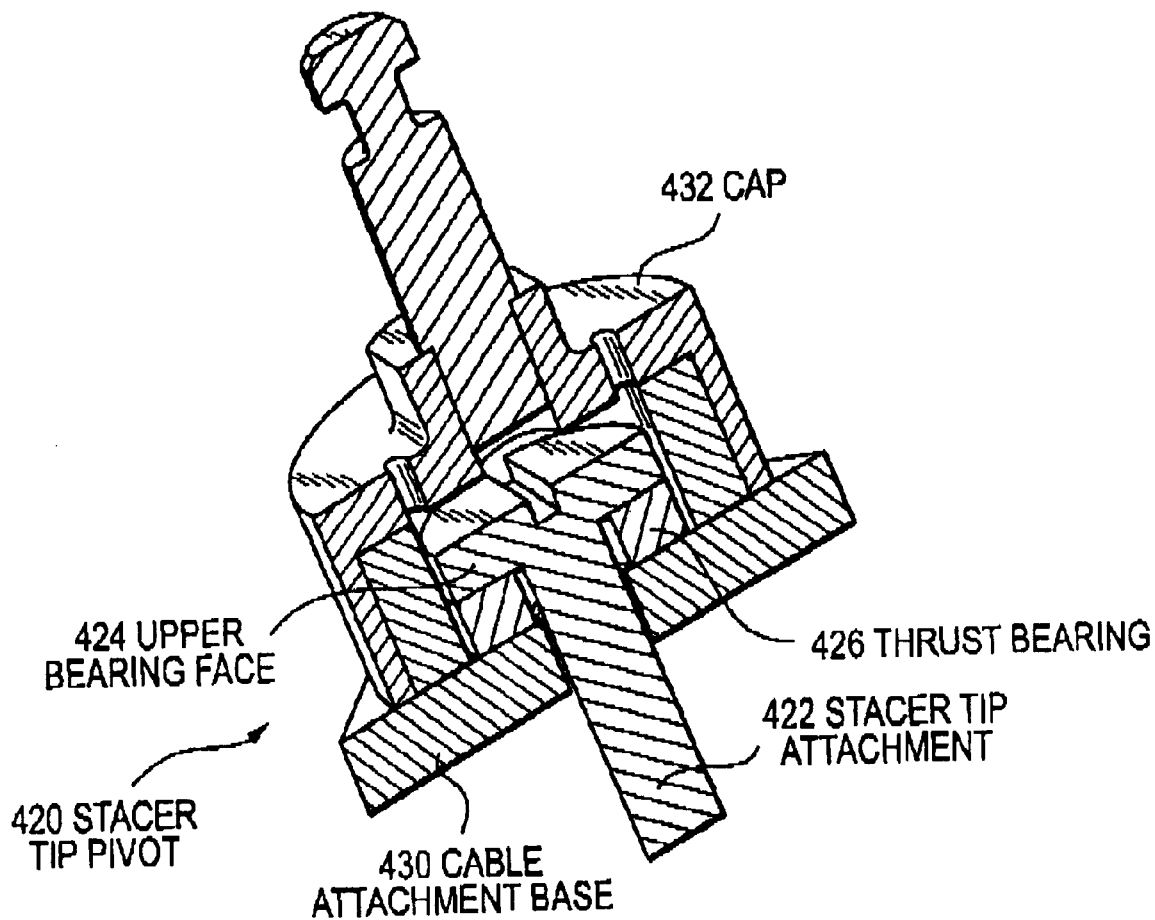
FIG. 4C is a cut-away perspective diagram of a tip pivot for a stacer, according to an embodiment.

As the stacer tubular portion changes length, the free end 414 rotates about the longitudinal axis 416. To prevent winding and tangling of cables, a tip pivot piece is attached to the free end of stacers. FIG. 4C is a cut-away perspective diagram of a tip pivot 420 for a stacer (hereinafter a "stacer tip pivot"), according to an embodiment. A lower thrust bearing 426 is placed on a cable attachment base 430. A stacer tip attachment that rotates with the stacer tip is inserted through the thrust bearing 426 and cable attachment base 430 into the stacer tip. An upper thrust bearing 424 is placed over the stacer tip attachment 422. A cap 432 screws over the assembly, holding the stacer tip attachment 422 and thrust bearings 424, 426 in place. When the stacer tip rotates, the cable attachment base 430 does not. Cables are attached to cable openings (such as cable opening 434) on the cable attachment base 430. The lower thrust bearing 426 and upper thrust bearing 424 allow the stacer tip attachment 422 to rotate with the stacer tip even as the stacer tip pushes against the cap 432 during expansion and during compaction, and as the stacer tip pushes against the cable attachment base 430 as a result of drag by the medium or by the cables.

Stacers can be arranged in a package, such as package 100, in any manner. Compacted stacers with strip widths less than about 5 inches (about 0.1 m) can be disposed in the package 100 with a spiral strip axis 416 perpendicular to the axis of the cylindrical housing. Compacted stacers with longer strip widths, such as the stacers of the illustrated embodiment, are disposed in the cylindrical housing of package 100 with their spiral strip axis 404 parallel to the axis of the cylindrical housing. When the housing cover panels are released, the longitudinal axis of the stacer is rotated away from the axis of the cylindrical housing. The rotation can be driven by motor or by springs or by gravity or by some other external force or combination of forces, either before, during or after the stacer expands to its natural configuration.

In the illustrated embodiment, the stacers expand with sufficient force to move through water and propel the bottom plate 320 away from the middle plate 310. For example, in some embodiments, the force during expansion of a stacer is about 15 to 20 pounds (about 65 to 90 Newtons) at the start, and decreases as the stacer expands. The speed of expansion for the illustrated embodiment is about ten feet per second (about three meters per second) in air or in a vacuum; but is slower in water.

Figure 5A:
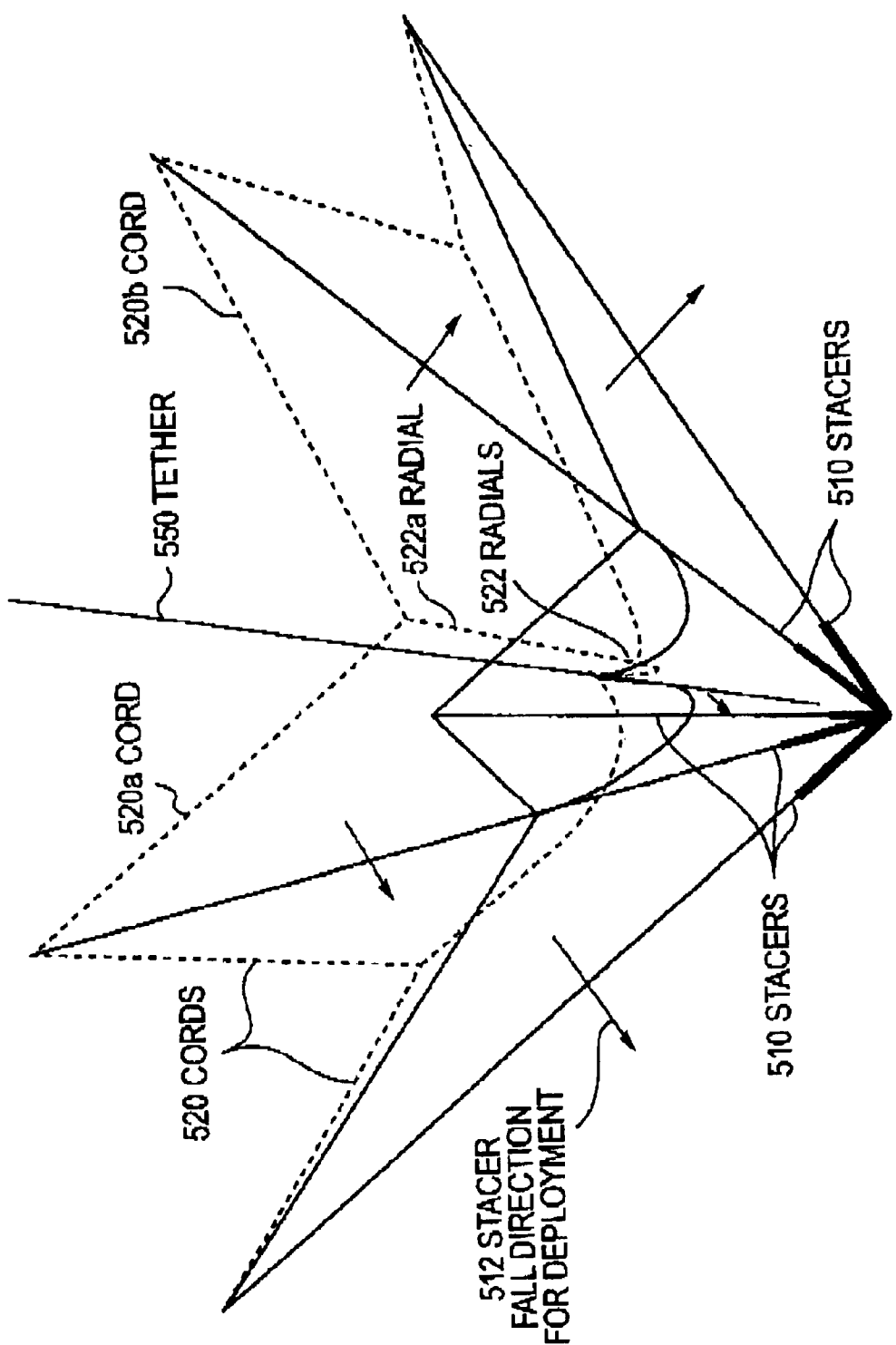
FIG. 5A is a perspective diagram of an expandable platform falling into deployed position using gravity among other forces, according to an embodiment.

FIG. 5A is a perspective diagram of an expandable platform falling into deployed position using gravity, according to an embodiment. A tether 550 connects the top plate (not shown) with fixed ends of five stacers, and defines the axis of the cylindrical housing. After extension to their natural configuration, five stacers 510 rotate away from the tether 550 under the influence of gravity and springs. The stacers fall directions 512 at the instant represented by the drawing in FIG. 5A are illustrated by the arrows. Cables are attached to the cable attachment base 430 of stacer tip pivots on the upper side of the stacer tip pivot 420, opposite the fall directions 512 to avoid tangling, as the stacer tips fall through the water in the fall direction 512. Cables include radial segments 522 and cord segments 520.

In the illustrated embodiment, the cord segments 520 and radial segments 522 are arranged to form a Y-shaped section between adjacent arms. For example, cord segments 520*a*, 520*b* and radial segment 522*a* form a Y-shaped section of the cable web. To avoid clutter, cable segments forming the two Y-shaped sections closest to the viewer in FIG. 5A are represented by thin solid lines. Cable segments forming three Y-shaped sections farthest from the viewer are represented by thick broken lines.

Figure 5B:
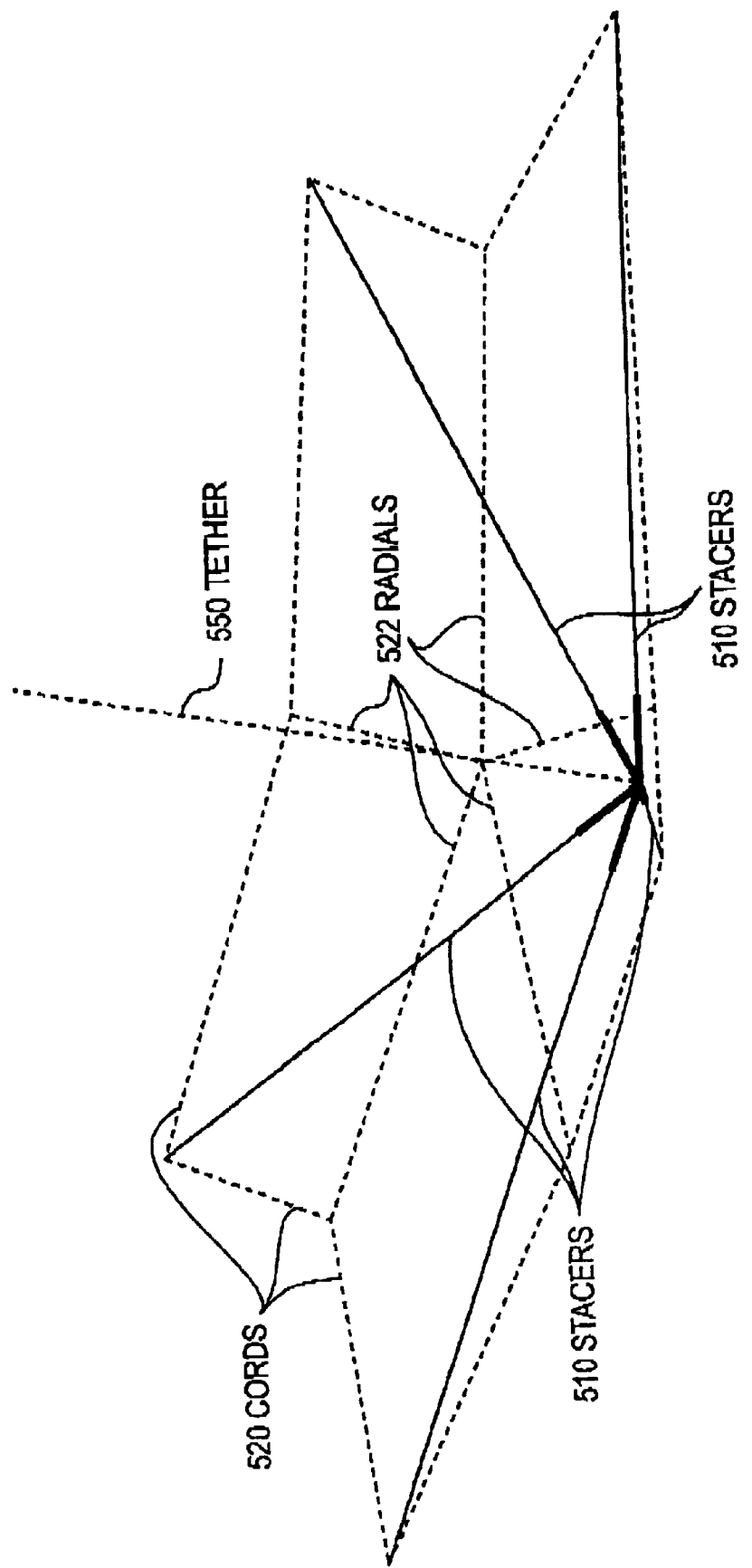
FIG. 5B is a perspective diagram of a fully deployed expanded platform, according to an embodiment.

FIG. 5B is a perspective diagram of a fully deployed expanded platform, according to an embodiment. The tether 550, stacers 510, and cable segments for cords 520 and radials 522 correspond to those depicted in FIG. 5A. The tether 550 and all cable segments 520, 522 are depicted with thick broken lines. The cable segments are pulled taut in a plane substantially perpendicular to the tether 550; and the stacers lie in the surface of a cone a few degrees above a plane perpendicular to the tether 550. This configuration adds to the rigidity of the expanded platform and reduces the deflection of the arm tips in shear currents.

Stacers have been used to deploy sensors on spacecraft. A single stacer can be deployed along the axis of rotation of the spacecraft. However, such deployments often involve two oppositely directed stacers not aligned with the axis of rotation of the spacecraft, with cable passing through the longitudinal axis of the stacer to a sensor. Because the stacers are paired, an odd number of arms, such as the five arms of the illustrated embodiments, cannot always be produced. Because the cables pass through the longitudinal axis, the rotation of stacer free ends are not an issue, and tip pivots are not used to avoid winding or tangling of external cables. The use in space does not indicate whether the stacers have sufficient force to move through water, pull cables from packages, open released cover panels, or whether the stacers have sufficient strength to maintain adequate rigidity in the face of shear currents and heave.

5. Y-shaped Cable Sections

Figure 5C:
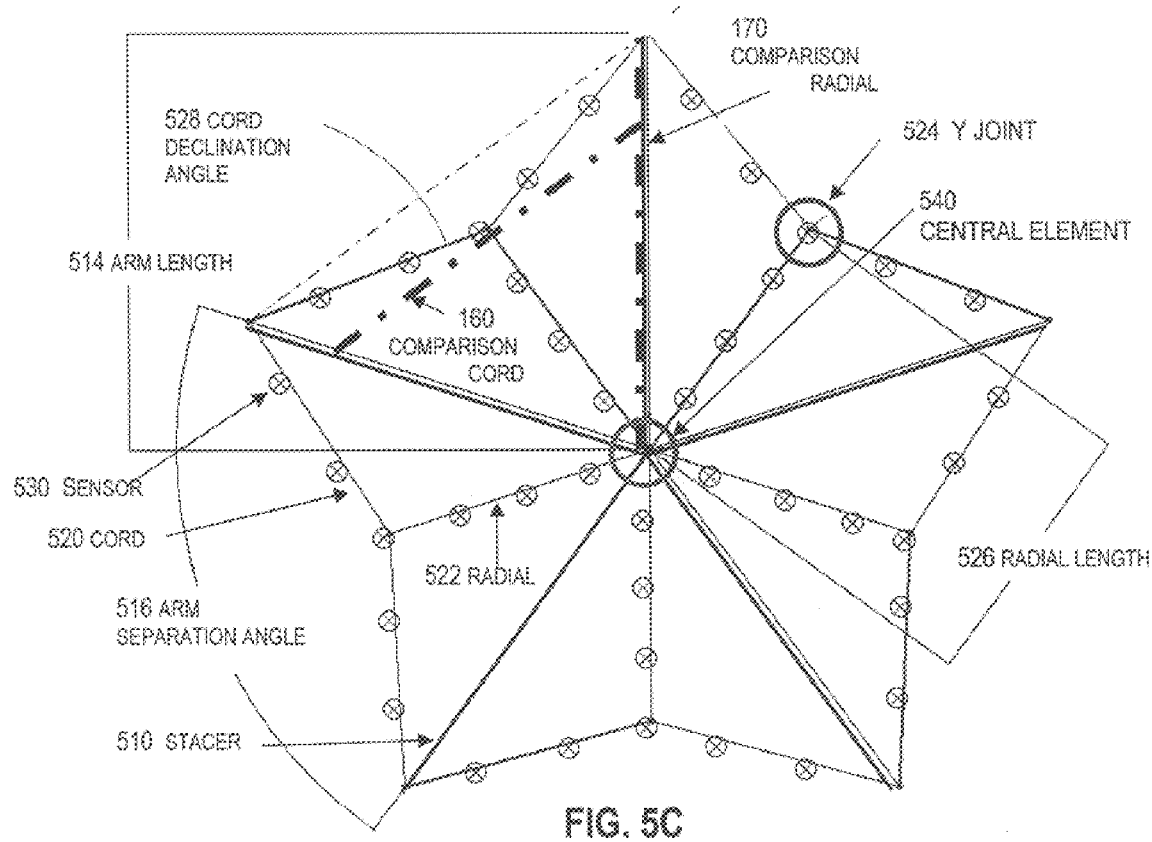
FIG. 5C is a plan view diagram of a fully deployed expanded platform, compared to a another arrangement of cables, according to some embodiments.

FIG. 5C is a plan view diagram of a fully deployed expanded platform, compared to another arrangement of cords and radial segments, according to some embodiments. Five stacers 510 serve as arms. Each arm has an arm length 514. For example, in a regular sonobuoy housing, arm length is about 20 feet (about 6 m). In a half-size sonobuoy housing, arm length is about 10 feet (about 3 m). The arms are connected at a central element 540 such as the structural core member 104 depicted in FIG. 1A. Adjacent stacers are separated by an arm separation angle 516, which is 72 degrees for five equally spaced arms.

The cable web is made up of cord segments 520 and radial segments 522 in five Y-shaped sections. In each Y-shaped section, two cord segments 520 and one radial segment 522 are connected to each other at a Y joint 524. The radial segment has a radial length 526. The angle between a cord and a straight line connecting adjacent arm tips is a cord declination angle 528. In the illustrated embodiment, the declination angle is 15 degrees.

Connected to the cable web are sensors 530. The sensors 530 can be arranged in a wide variety of patterns by attaching them at different locations along the cable segments of the cable web. For example, in the illustrated embodiment, a primarily two-dimensional star-in-box pattern of sensors in a plane is achieved.

According to some embodiments, a standard sized package includes ELGILOY material memory stacers with compacted lengths less than about 15 inches (0.4 m). Stacers for multiple arms can be arranged in parallel to a central axis of the package, which can be up to five inches (0.1 m) in diameter. When restraints are released, the stacers expand into multiple arms with taut cable web, each arm over 11 feet (about 3.5 m) in length, that can withstand shear currents up to about two knots for at least several days.

According to some embodiments, a half-length standard sized package includes material memory stacers with compacted lengths less than about 7 inches (0.2 m). Stacers for multiple arms can be arranged in parallel to a central axis of the package, which can be up to five inches (0.1 m) in diameter. When restraints are released, the stacers expand into multiple arms with taut cable web, each arm over 6 feet (about 2 m) in length, that can withstand shear currents up to about two knots for at least several days.

In an alternate embodiment, the compact stacers less than five inches in length are arranged perpendicularly to the central axis of the package, each stacer at a different distance along the central axis. When restraints are released, the stacers expand into multiple arms with taut cable web, each arm over 6 feet (about 2 m) in length, that can withstand shear currents up to about two knots for at least several days.

According to some embodiments, a half or standard sized package includes multiple sets of material memory stacers with compacted lengths less than about 5 inches (0.1 m). Stacers for multiple arms in each set are arranged perpendicular to a central axis of the package, which can be up to five inches (0.1 m) in diameter. When restraints are released, the stacers in each set expand into multiple arms with taut cable web, each arm over 6 feet (about 2 m) in length, that can withstand shear currents up to about two knots for at least several days.

Also depicted in FIG. 5C is another arrangement of taut cord and radial segments for comparison, used in some embodiments. A comparison radial segment 170 is aligned with an arm in the plan view. A comparison cord segment 160 attaches to each of two adjacent arms at a tip portion displaced from the tip toward the central element 540. The comparison arrangement is in common use with arms that do not include material memory components, such as with telescoping arms. It is believed that the Y-shaped sections, described above, provide greater rigidity to the platform than the comparison arrangement of cords and radials.

6. Arms with Multiple Material Memory Components

In some embodiments, greater arm length and less tip rotation are achieved by pairing material memory elements within a single arm.

In one embodiment, two tapes sharing an axel at the center of the spiral can be deployed in place of one. The free end of this arrangement is the outer strip end on the second spiral strip. The joined strip ends at the center of each spiral strip become the middle of the beam for the arm, when the two spirals unwind. If the center strip ends are connected to the common axel so that the spirals both unwind with the same rotation of the axel, then both spirals unwind as the axel rotates, and the free end of the second spiral does not rotate. In some embodiments of this type, a tip pivot 218 can be omitted without causing winding or tangling cables.

Similarly, two stacers with opposite longitudinal axes can be deployed in place of one. The free end of this arrangement is the base of the second stacer. The joined stacer ends become the middle of the tube for the arm. If the strip ends are connected so that both ends expand with the same rotation about the longitudinal axis, then the free end (base) of the second stacer does not rotate. In some embodiments of this type, a stacer tip pivot 420 can be omitted without causing winding or tangling cables.

In some embodiments, more than two material memory components can be included in each arm. Tip pivots may be useful in embodiments with an odd number of material memory components.

In some embodiments, material memory components of different types are combined in the same arm or in different arms of the same platform.

7. Stacked platforms

In some embodiments, more complex three-dimensional arrangements of sensors can be achieved by stacking multiple platforms, displaced vertically along a tether. For example, in the same housing that encloses one platform depicted in FIG. 5B with a maximum arm length, three platforms of similar shape can be stacked along tether 550, but each with shorter arm length.

In some embodiments, the platform at each vertical position can be different. For example, a five-arm platform can be sandwiched between two three-arm platforms. In other examples, a stacer platform as in FIG. 5B can stacked with a tape platform as in FIG. 3B 8. Extensions and Alternatives In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An expandable platform for deploying sensors in a medium comprising:

a housing;

a structural member disposed inside the housing;

a restraint releasably connected to the structural member;

a plurality of arms connected to the structural member, wherein each arm includes a material memory component that has a natural state, corresponding to a minimum energy state, in an extended configuration, is energized by compacting the material memory component so that the arm fits within the housing, is restrained in an energized state by the restraint, and naturally transforms toward the extended configurations under its own force when the restraint is released;

a flexible cable external to the plurality of arms, which cable is connected to each arm of two or more of the plurality of arms at a tip portion of the arm, which tip portion is disposed farthest from the structural member when the material memory component is in the extended configuration; and a plurality of sensors connected to the cable.

2. The expandable platform as recited in claim 1, wherein the material memory component of an arm of the plurality of arms is a stacer that has:

the natural state similar to a tube that has a tube length and a longitudinal axis; and the energized state as a spiral strip that has a strip width much less than the tube length and a spiral axis for the spiral strip that is substantively coincident with the longitudinal axis.

3. The expandable platform as recited in claim 2, wherein, in the natural state, the strip makes a plurality of circuits around the longitudinal axis, and each circuit overlaps at least one adjacent circuit by about half the strip width.

4. The expandable platform as recited in claim 1, wherein the material memory component of an arm of the plurality of arms is a tape that has:

the natural state as a beam that has a beam length, a longitudinal axis, a beam width, and an arcuate cross section; and the energized state as a spiral strip that has a spiral diameter much less than the beam length and a spiral axis for the spiral strip that is substantively parallel to the beam width and perpendicular to the longitudinal axis.

5. The expandable platform as recited in claim 1, wherein an angle between two adjacent arms of the plurality of arms measures substantively less than 180 degrees when the restraint is released.

6. The expandable platform as recited in claim 1, wherein each arm of the plurality of arms is connected to the structural member through a hinge that opens to a deployed configuration after the restraint is released; and an angle between two adjacent arms of the plurality of arms measures substantively less than 180 degrees when the hinge is in the deployed configuration.

7. The expandable platform as recited in claim 1, wherein each arm includes two material memory components coupled to transform to their extended configurations in opposite rotations about a common axis so that there is substantively no rotation at the tip portion of the arm.

8. The expandable platform as recited in claim 1, the tip portion of each arm further comprising a pivot component rotationally coupled to the material memory component.

9. The expandable platform as recited in claim 8, wherein:
the pivot component is shaped to align a trailing edge of the pivot component opposite to a direction of flow of the tip portion relative to the medium; and
the cable is connected to the pivot component along the trailing edge.

10. The expandable platform as recited in claim 9, wherein the direction of flow of the tip portion relative to the medium is determined while the material memory component transforms toward the extended configuration.

11. The expandable platform as recited in claim 9, wherein the direction of flow of the tip portion relative to the medium is downward after the restraint is released and after the material memory component finishes transforming toward the extended configuration.

12. The expandable platform as recited in claim 1, wherein, after the restraint is released, the cable is pulled taut by at least one of the force of the material memory component on each arm connected to the cable and another external force.

13. The expandable platform as recited in claim 12, wherein tension on the cable inhibits deflection of each arm connected to the cable beyond a predetermined deflection amount.

14. The expandable platform as recited in claim 12, wherein the cable comprises:
a cord segment connecting a pair of arms of the plurality of arms at the tips portion of each arm; and
a radial segment connecting the tip portion of at least one arm to the structural member.

15. The expandable platform as recited in claim 12, wherein:
the cable comprises at least one Y section that includes three segments joined at a cable joint;
each of two cord segments in the Y section is connected to a corresponding arm of the plurality of arms at the tip portion of the corresponding arm; and,
a different radial segment in the Y section is connected to the structural member.

16. The expandable platform as recited in claim 1, wherein, after the restraint is released, the cable is pulled taut at least in part by the force of the material memory component on each arm connected to the cable.

17. The expandable platform as recited in claim 1, wherein:
the cable is packed in a cable package; and,
after the restraint is released, the cable is pulled from the cable package at least in part by the force of the material memory component on each arm connected to the cable.

18. The expandable platform as recited in claim 1, wherein:
the medium is water;
the housing is cylindrically shaped with a diameter of about 0.1 meters and a length of about 0.4 meters; and,
after the restraint is released, the tip portion extends more than about 3.5 meters from the structural member for at least several days in shear currents up to about two knots.

19. The expandable platform as recited in claim 1, wherein:
the medium is water;
the housing is cylindrically shaped with a diameter of about 0.1 meters and a length of about 0.2 meters; and,
after the restraint is released, the tip portion extends more than about 2 meters from the structural member for at least several days in shear currents up to about two knots.

20. The method as recited in claim 4, wherein:
the medium is water;
the housing is cylindrically shaped with a diameter of about 0.1 meters and a length of about 0.1 meters; and,
after the restraint is released, the tip portion extends more than about one meter from the structural member for at least several days in shear currents up to about one knot.

21. The method as recited in claim 4, wherein:
the medium is water;
the housing is cylindrically shaped with a diameter of about 0.05 meters and a length of about 0.3 meters; and,
after the restraint is released, the tip portion extends more than about one meter from the structural member for at least several days in shear currents up to about one knot.

22. The expandable platform as recited in claim 1, wherein:
the restraint is attached to the housing; and
when the restraint is released, at least a portion of the housing attached to the restraint is also released.

23. A method of fabricating an expandable platform for deploying sensors in a medium, the method comprising:
connecting the plurality of sensors to a web of cable segments;
compacting and restraining a plurality of arms inside a housing, each arm comprising a material memory component having material memory for an extended configuration that has at least one dimension that exceeds any dimension of the housing;
packing the web of cable segments in a package inside the housing and outside material memory components of the plurality of arms;
attaching at least one cable segment to a tip portion of each arm, which tip portion is disposed farthest from the housing when the material memory component is in the extended configuration; and
preparing for deployment in the medium, comprising, after the housing is launched into the medium by a user, providing for the steps of;
extracting the cable from the package, and
freeing each arm of the plurality of arms to automatically expand outside the housing to the expanded configuration under a motive force supplied by the material memory.

24. The method as recited in claim 23, wherein:
the material memory component of an arm of the plurality of arms is a stacer that has the extended configuration similar to a tube that has a tube length and a longitudinal axis; and
said step of compacting the plurality of arms further comprises compacting each stacer into a spiral strip that has a strip width much less than the tube length and a spiral axis for the spiral strip that is substantively coincident with the longitudinal axis.

25. The method as recited in claim 24, wherein, in the extended configuration, the strip makes a plurality of circuits around the longitudinal axis, and each circuit overlaps at least one adjacent circuit by about half the strip width.

26. The method as recited in claim 23, wherein:
the material memory component of an arm of the plurality of arms is a tape that has the extended configuration as a beam that has a beam length, a longitudinal axis, a beam width, and an arcuate cross section; and
said step of compacting the plurality of arms further comprises compacting each tape into a spiral strip that has a spiral diameter much less than the beam length and a spiral axis for the spiral strip that is substantively parallel to the beam width and perpendicular to the longitudinal axis.

27. The method as recited in claim 23, wherein, after the plurality of arms are freed to expand outside the housing, an angle between two adjacent arms of the plurality of arms measures substantively less than 180 degrees.

28. The method as recited in claim 23, further comprising attaching each arm of the plurality of arms through a hinge that opens to a deployed configuration after the plurality of arms are freed to expand outside the housing, wherein an angle between two adjacent arms of the plurality of arms measures substantively less than 180 degrees when the hinge is in the deployed configuration.

29. The method as recited in claim 23, wherein:
each arm includes two coupled material memory components, and
said step of compacting the plurality of arms further comprises compacting the coupled material memory component in opposite rotations about a common axis so that there is substantively no rotation at the tip portion of the arm when the arm automatically expands during said freeing step.

30. The method as recited in claim 23, the tip portion of each arm further comprising a pivot component rotationally coupled to the material memory component.

31. The method as recited in claim 30, said attaching the at least one cable segment step further comprising connecting the cable segment to the pivot component along a trailing edge of the pivot component opposite to a direction of flow of the tip portion relative to the medium.

32. The method as recited in claim 23, said providing step further comprising causing a cable segment of the web of cable to be pulled taut by at least one of gravity and the force of the material memory component on each arm.

33. The method as recited in claim 32, wherein tension on the web of cable inhibits deflection of each arm beyond a predetermined deflection amount.

34. The method as recited in claim 32, said step of attaching the at least one cable segment further comprising:
attaching a cord segment to a pair of arms of the plurality of arms at the tips portion of each arm; and
attaching a radial segment to the tip portion of at least one arm and a structural member inside the housing.

35. The method as recited in claim 32, wherein:
the web of cable comprises at least one Y section that includes three cable segments joined at a cable joint; and
said step of attaching the at least one cable segment further comprises:
attaching each of two cord segments in the Y section to a corresponding arm of the plurality of arms at the tip portion of the corresponding arm; and,
attaching a different radial segment in the Y section to a structural member inside the housing.

36. The method as recited in claim 23, said providing step further comprising causing a cable segment of the web of cable to be pulled taut at least in part by the motive force of the material memory component on each arm connected to the cable segment.

37. The method as recited in claim 23, said providing step further comprising causing, the cable to be pulled from the cable package at least in part by the motive force of the material memory component on each arm connected to the cable segment.

38. The method as recited in claim 23, wherein:
the medium is water;
the housing is cylindrically shaped with a diameter of about 0.1 meters and a length of about 0.4 meters; and,
said providing for freeing the plurality of arms causes each arm to expand outside the housing more than about 3.5 meters for at least several days in shear currents up to about two knots.

39. The method as recited in claim 23, wherein:
the medium is water;
the housing is cylindrically shaped with a diameter of about 0.1 meters and a length of about 31.2 meters; and,
said providing for freeing the plurality of arms causes each arm to expand outside the housing about 3 meters for at least several days in shear currents up to about two knots.

40. The method as recited in claim 26, wherein:
the medium is water;
the housing is cylindrically shaped with a diameter of about 0.1 meters and a length of about 31.1 meters; and,
said providing for freeing the plurality of arms causes each arm to expand outside the housing more than one meter for at least several days in shear currents up to about one knot.

41. The method as recited in claim 26, wherein:
the medium is water;
the housing is cylindrically shaped with a diameter of about 0.05 meters and a length of about 0.3 meters; and,
said providing for freeing the plurality of arms causes each arm to expand outside the housing more than about one meter for at least several days in shear currents up to about one knot.

42. The method as recited in claim 23, said providing for freeing the plurality of arms further comprising providing for releasing at least a portion of the housing.

43. An expandable platform for deploying a plurality of sensors in a medium comprising:
a means for connecting the plurality of sensors to a web of cable segments;
a means for compacting and restraining a plurality of arms inside a housing, each arm comprising a material memory component having material memory for an extended configuration that has at least one dimension that exceeds any dimension of the housing;
a means for packing the web of cable segments in a package inside the housing and outside a plurality of material memory components of the plurality of arms;
a means for attaching at least one cable segment to a tip portion of each arm, which tip portion is disposed farthest from the housing when the material memory component is in the extended configuration;
a means for extracting the cable from the package after the housing is launched into the medium by a user; and
a means for freeing each arm of the plurality of arms after the housing is launched into the medium by a user to automatically expand outside the housing to the expanded configuration under a motive force supplied by the material memory.

* * * * *

UNITED STATES PATENT AND TRADEMARK OFFICE
CERTIFICATE OF CORRECTION

PATENT NO. : 6,597,631 B2
DATED : July 22, 2003
INVENTOR(S) : David A. Kitchin et al.

It is certified that error appears in the above-identified patent and that said Letters Patent is hereby corrected as shown below:

<u>Title page,</u>
Item [75], Inventors, insert -- Charles W. Kerechanin II, Burtonsville, MD (US) and Charles W. Anderson, Pasadena, MD (US) --

Signed and Sealed this

Twenty-seventh Day of July, 2004

JON W. DUDAS
*Acting Director of the United States Patent and Trademark Office*